United States Patent [19]

Furukawa et al.

[11] Patent Number: 5,008,164
[45] Date of Patent: Apr. 16, 1991

[54] HYDROGEN-ABSORBING ALLOY ELECTRODE

[75] Inventors: Nobuhiro Furukawa, Hirakata; Kenji Inoue, Sumoto; Mitsuzo Nogami, Yawata; Seiji Kameoka, Osaka; Motoo Tadokoro, Ashiya, all of Japan

[73] Assignee: Sanyo Electric Co., Ltd., Osaka, Japan

[21] Appl. No.: 448,438

[22] Filed: Dec. 11, 1989

[30] Foreign Application Priority Data

Apr. 18, 1989 [JP] Japan ..................................... 1-98322

[51] Int. Cl.$^5$ ...................... H01M 4/24; H01M 4/38; C22C 19/03
[52] U.S. Cl. ...................................... 429/59; 429/218; 420/455; 420/900
[58] Field of Search ........................ 429/59, 101, 218; 420/455, 900

[56] References Cited

U.S. PATENT DOCUMENTS

| | | | |
|---|---|---|---|
| 4,147,536 | 4/1979 | Osumi et al. | 420/900 X |
| 4,396,576 | 8/1983 | Osumi et al. | 420/900 X |
| 4,487,817 | 12/1984 | Willems . | |
| 4,605,603 | 8/1986 | Kanda et al. | 420/900 X |

FOREIGN PATENT DOCUMENTS

| | | | |
|---|---|---|---|
| 60-250558 | 12/1985 | Japan . | |
| 61-91863 | 5/1986 | Japan | 420/900 |
| 62-20245 | 1/1987 | Japan . | |
| 62-271349 | 11/1987 | Japan . | |

Primary Examiner—Stephen J. Kalafut
Attorney, Agent, or Firm—Armstrong, Nikaido, Marmelstein, Kubovcik & Murray

[57] ABSTRACT

A hydrogen-absorbing alloy electrode comprising a hydrogen-absorbing alloy represented by a formula $ANi_aCo_bMn_c$ or $ANi_aCo_bMn_cX_d$, A representing a mixture of rare earth elements including La and X representing at least one element selected from a group of Fe, Cu, Mo, W, B, Al, Si and Sn, wherein $2.5 \leq a \leq 3.5$, $0.4 \leq b \leq 1.5$, $0.2 \leq c \leq 1.0$, and $3.85 \leq a+b+c \leq 4.78$ in the case of $ANi_aCo_bMn_c$ or $2.5 \leq a \leq 3.5$, $0.4 \leq b \leq 1.5$, $0.2 \leq c \leq 1.0$, $0 < d \leq 0.3$ and $3.85 \leq a+b+c+d \leq 4.78$ in the case of $ANi_aCo_bMn_cX_d$, is disclosed. La is contained in a weight ratio (%) of $20 \leq La \leq 50$ against a total weight of the rare earth elements.

6 Claims, 6 Drawing Sheets

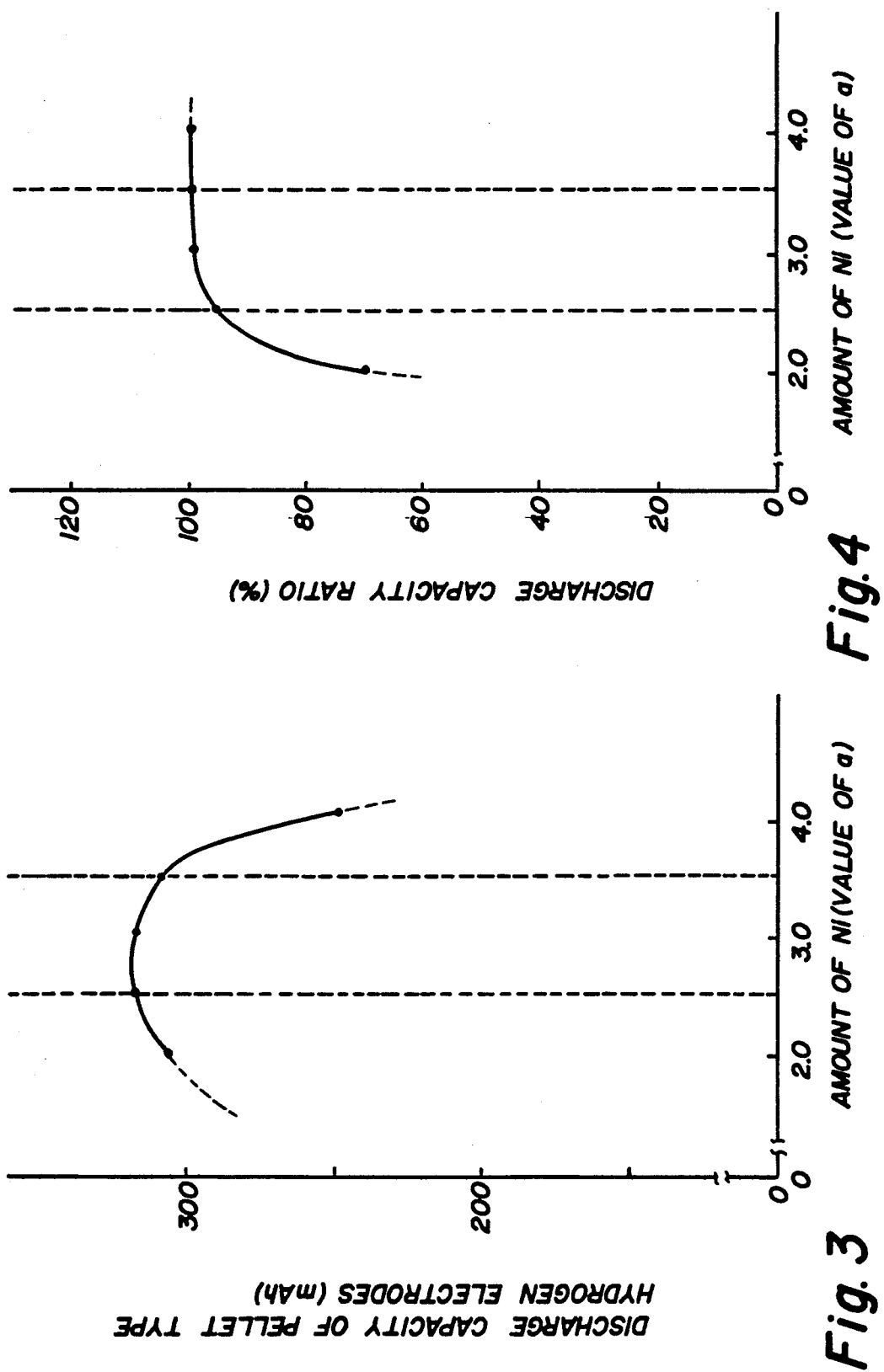

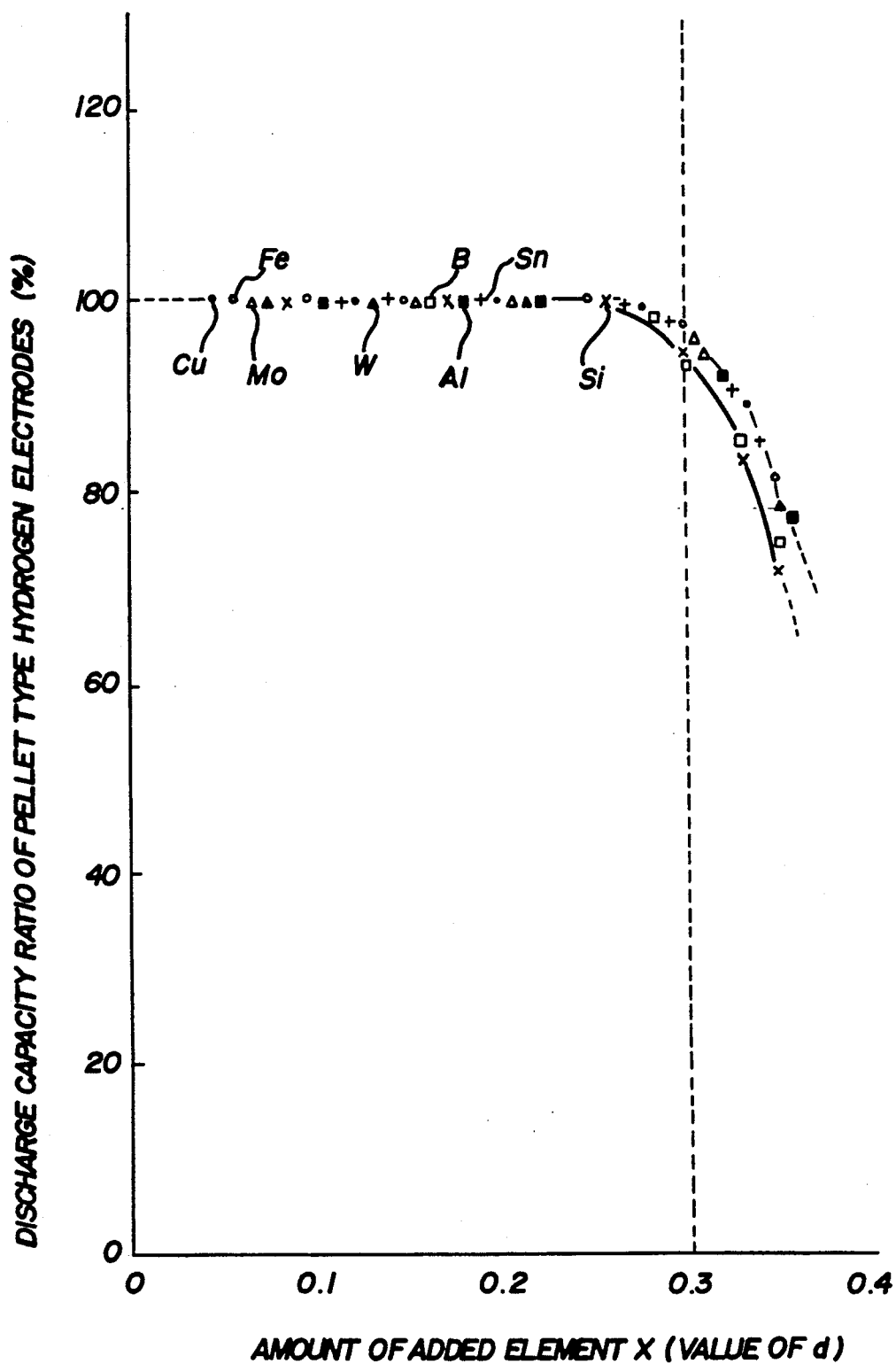

HYDROGEN-ABSORBING ALLOY ELECTRODE

BACKGROUND OF THE INVENTION (1) Field of the Invention

This invention relates to a hydrogen-absorbing alloy electrode used as a negative electrode of an alkaline storage cell.

(2) Description of the Prior Art

An alkaline storage cell employing a hydrogen-absorbing alloy for its negative electrode has the following advantages over a nickel-cadmium cell.

(a) Can have higher energy density.
(b) Can have longer cycle life.
(c) Can have excellent over discharge characteristics.
(d) Can endure fast charge.

Because of these advantages, a hydrogen-absorbing alloy has recently attracted attention as a material of the next-generation alkaline storage cell and been thoroughly researched on.

Especially active research is taking place on hydrogen-absorbing alloys which contain rare earth elements. These type of alloys have $CaCu_5$-type hexagonal structure such as $LaNi_5$. Since cells employing the above alloys are excellent in (a) and (b), various improvements in various aspects have been tried on such cells. One of the improvements is to use Misch metal (Mm) instead of expensive La in order to reduce manufacturing cost of the alloy. Mm is a mixture of rare earth elements.

Japanese Patent Publication laid-open No. 62-20245 has disclosed an example of such an improvement, which is hydrogen-absorbing alloys represented by a formula $LnNi_x(Co_aMm_bAl_c)_y$ [Ln is Mm only or a mixture of Mm and La; La is contained in Mn in a weight ratio (%) of $25 \leq La \leq 75$ the other parameters are $3.5 \leq x \leq 4.3$; $0.7 \leq y \leq 1.7$; $4.3 \leq x+y \leq 5.5$; $0.2 \leq b \leq 0.8$; and $0.1 \leq c \leq 0.5$.]

However, negative electrodes employing the above alloys are not desirable for use in a sealed type storage cell in terms of safety because hydrogen absorption/desorption equilibrium pressures of the alloys are high. Neither do they achieve much improvement in cell characteristics such as cycle characteristics.

SUMMARY OF THE INVENTION

Accordingly, it is a primary object of this invention to provide a hydrogen-absorbing alloy electrode whose hydrogen-absorbing alloy has a low hydrogen absorption/desorption equilibrium pressure and which is applicable for a sealed storage cell.

It is another object of this invention to provide a hydrogen-absorbing alloy electrode which remarkably improves cell characteristics such as cycle characteristics when used in a sealed type storage cell.

The above objects are fulfilled by a hydrogen-absorbing alloy electrode mainly comprising a hydrogen-absorbing alloy represented by a formula $ANi_aCo_bMn_c$, A representing a mixture of rare earth elements including La, wherein $2.5 \leq a \leq 3.5$, $0.4 \leq b \leq 1.5$, $0.2 \leq c \leq 1.0$, and $3.85 \leq a+b+c \leq 4.78$.

La may be contained in a weight ratio (%) of $20 \leq La \leq 50$ with respect to the total weight of the rare earth elements.

It is for the following reasons that the above objects are fulfilled by the above composition.

When the value of a (amount of Ni) is reduced to less than 2.5, the alloy gets hard to activate since nickel acting as a catalyst becomes less active. When the value of a exceeds 3.5, the discharge capacity is lowered because the hydrogen absorption/desorption equilibrium pressure of the alloy is raised. When the value of b (amount of Co) is reduced to less than 0.4, the discharge capacity ratio (the ratio of the discharge capacity after charge-discharge cycles against the initial discharge capacity) is lowered due to the decline of the corrosion resistance of the alloy against alkali. When the value of b exceeds 1.5, the discharge capacity ratio is also lowered because Co is dissolved out of the alloy by overdischarging. When the value of c (amount of Mn) is reduced to less than 0.2, the storage characteristic is deteriorated since the hydrogen absorption/desorption equilibrium pressure of the alloy is raised and so self-discharge is accelerated. When the value of c is more than 1.0, the storage characteristic is also deteriorated because Mn is dissolved out of the alloy.

When the value of $a+b+c$ is less than 3.85 or more than 4.78, the discharge capacity is lowered or the cycle life is shortened. The reasons are: (1) hydrogen is hard to be absorbed since the unit cell volume the crystal lattice of the metal phase involved in hydrogen absorption/desorption is decreased; (2) the amount of hydrogen absorbed under the same pressure is lowered due to an increase of the equilibrium pressure; and (3) the inner pressure of the cell is raised to operate a level sufficient to activate the safety valve, thereby the electrolyte is leaked.

The above objects are also fulfilled by a hydrogen-absorbing alloy electrode mainly comprising a hydrogen-absorbing alloy represented by a formula $ANi_aCo_bMn_cX_d$, A representing a mixture of rare earth elements including La and X representing at least one element selected from a group of Fe, Cu, Mo, W, B, Al, Si and Sn, wherein $2.5 \leq a \leq 3.5$, $0.4 \leq b \leq 1.5$, $0.2 \leq c \leq 1.0$, $0 < d \leq 0.3$, and $3.85 \leq a+b+c+d \leq 4.78$.

La may be contained in a weight ratio (%) of $20 \leq La \leq 50$ against a total weight of the rare earth elements.

It is the following reason in addition to the above-mentioned ones that the above objects are fulfilled by the above composition.

When an element X such as Fe is added, the added element exists as a thin barrier layer on a surface of the alloy, whereby further improving the storage characteristics.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

FIG. 3 is a graph showing the relationship between the amount of Ni (value of a) in a hydrogen-absorbing alloy and the discharge capacity of each pellet type hydrogen electrode, FIG. 4 is a graph showing the relationship between the amount of Ni (value of a) in a hydrogen-absorbing alloy and the discharge capacity ratio of each test cell, FIG. 8 is a graph showing the relationship between the amount of the added element X (value of d) in a hydrogen-absorbing alloy and the discharge capacity ratio of each pellet type hydrogen electrode.

DESCRIPTION OF THE PREFERRED EMBODIMENTS

Embodiment I

Example I of the Present Invention

Figure 1:
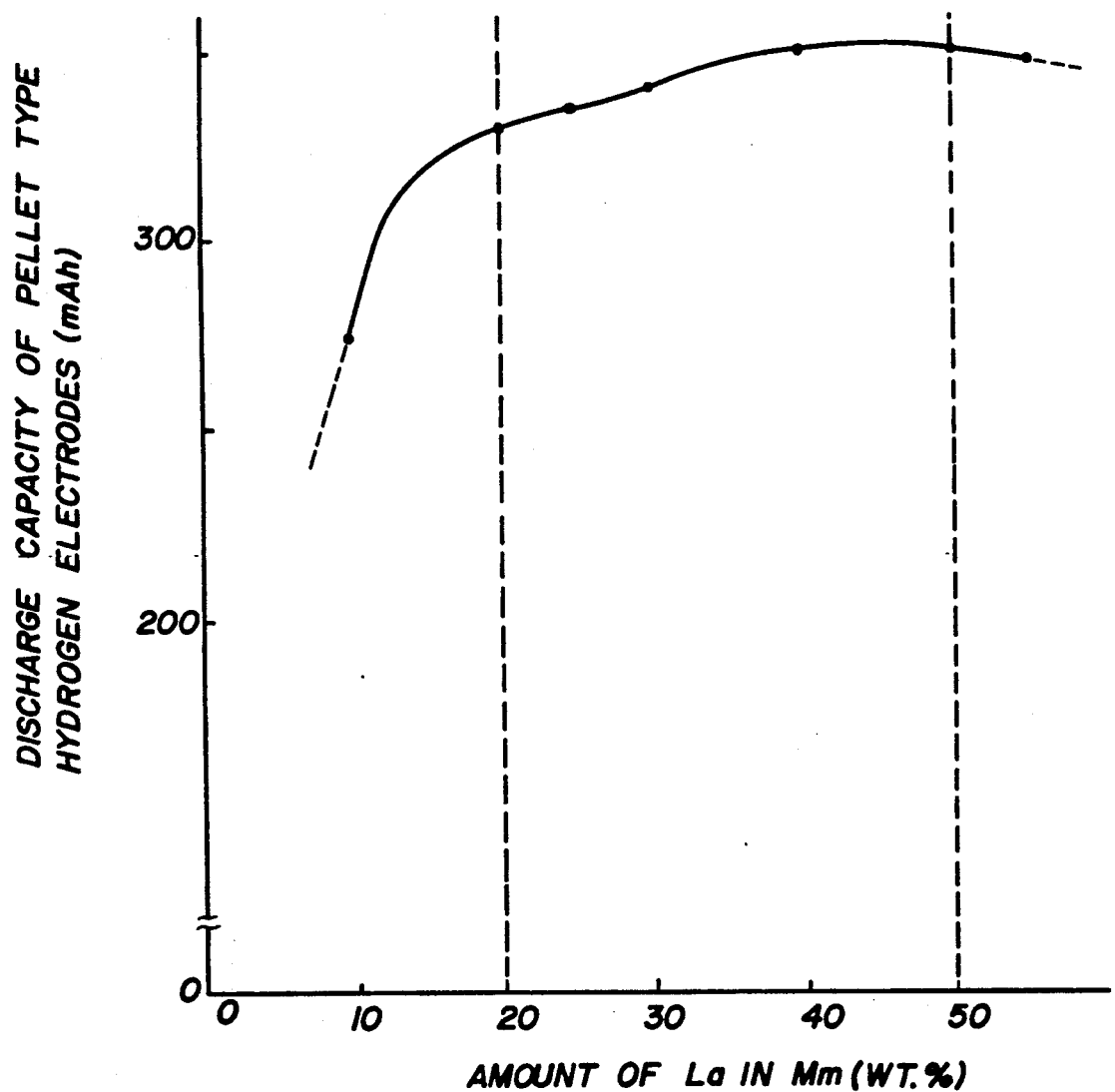
FIG. 1 is a graph showing the relationship between the amount of La in Mm and the discharge capacity of each pellet type hydrogen electrode.

Hydrogen-absorbing alloys were prepared by using Misch metal (Mm; containing 25 wt. % of La), Ni, Co and Mn, all available on the market, in an arc furnace having an inactive argon atmosphere. In a formula $ANi_aCo_bMn_c$, a:b:c was set 3.0:1.5:0.5 and a+b+c was set 4.78. A is a mixture of rare earth elements and Mn is used as A in Embodiments I through III. The above-obtained hydrogen-absorbing alloys were mechanically pulverized into grains having an average grain size of 50 μm or less, and was kneaded with 10 wt. % of powdered polytetrafluorethylene (PTFE) as a binder into a paste. The paste was coated on a current collector comprising a punched metal, whereby a hydrogen-absorbing alloy electrode was produced. The electrode obtained in this way will be referred to as Electrode $a_1$.

A spiral wound electrode assembly was formed of Electrode $a_1$, a nickel sintered electrode having a capacity of 600 mAh and a separator formed of a nonwoven fabric. After the electrode assembly was incorporated into a cell can, an electrolyte formed of an aqueous solution of KOH having a density of 30 wt. % was injected into the cell can, and the can was sealed. In this way, a sealed type nickel-hydrogen alkaline storage cell was produced. This cell will be referred to as Cell $A_1$.

Examples II through VI of the Present Invention

Electrodes $a_2$ through $a_6$ were produced in the same method as Electrode $a_1$ was except the value of a+b+c in the formula $ANi_aCo_bMn_c$. The value was set 4.6 for Electrode $a_2$, 4.4 for Electrode $a_3$, 4.2 for Electrode $a_4$, 4.0 for Electrode $a_5$ and 3.85 for Electrode $a_6$.

Cells $A_2$ through $A_6$ were produced respectively using Electrodes $a_2$ through $a_6$ in the same way as Cell $A_1$ was.

Comparative examples I, II and III

Electrodes $x_1$, $x_2$ and $x_3$ were produced in the same method as Electrode $a_1$ was except that the values of a+b+c in the formula $ANi_aCo_bMn_c$ were respectively set b 5.0, 4.9 and 3.7.

Cells $X_1$, $X_2$ and $X_3$ were produced respectively using Electrodes $x_1$, $x_2$ and $x_3$ in the same method as Cell $A_1$ was.

Experiment IA

The hydrogen-absorbing alloys used for Electrodes $a_1$ through $a_6$ according to the present invention and Electrodes $x_1$ through $x_3$ as the comparative examples were roughly pulverized, thereafter the equilibrium pressures were measured. Table 1 shows the results. The hydrogen absorption/desorption equilibrium pressures are obtained from P-C isotherms.

TABLE 1

| | Alloy composition (a + b + c value) | Equilibrium pressure of alloy (atm) | Hydrogen discharge capacity (mAh) | Cell characteristics ($A_1 - A_6$ + $X_1 - X_3$) | |
|---|---|---|---|---|---|
| | | | | Cycle life (time) | Lost weight (g) |
| Electrode | | | | | |
| $a_1$ | 4.78 | 0.90 | 296 | 850 | 0.12 |
| $a_2$ | 4.6 | 0.76 | 315 | 840 | 0.11 |
| $a_3$ | 4.4 | 0.68 | 319 | 790 | 0.08 |
| $a_4$ | 4.2 | 0.60 | 325 | 825 | 0.14 |
| $a_5$ | 4.0 | 0.46 | 302 | 800 | 0.13 |
| $a_6$ | 3.85 | 0.32 | 289 | 670 | 0.21 |
| $x_1$ | 5.0 | 3.8 | 203 | 300 | 0.69 |
| $x_2$ | 4.9 | 3.50 | 215 | 320 | 0.63 |
| $x_3$ | 3.7 | 0.39 | 244 | 280 | 0.58 |

As shown in Table 1, the hydrogen-absorbing alloys of Electrodes $a_1$ through $a_6$ showed much lower equilibrium pressures than those of Electrodes $x_1$ and $x_2$. The reason is: since the unit cell volume of crystal lattice of the metal phase involved in hydrogen absorption/desorption is larger, hydrogen is more easily absorbed and hydride is thermodynamically more stable in Electrodes $a_1$ through $a_6$ than Electrodes $x_1$ and $x_2$.

Although the hydrogen-absorbing alloy of Electrode $x_3$ showed a low equilibrium pressure, it is inferior to the present invention cells as will be described later.

Experiment IB

The same hydrogen-absorbing alloys as those used for Electrodes $a_1$ through $a_6$ and Electrodes $x_1$ through $x_3$ were kneaded with PTFE in the method mentioned in Experiment IA into pastes. These pastes were each wrapped up by nickel mesh and molded by a pressure of 1 ton/cm² into pellet type hydrogen electrodes. The hydrogen-absorbing alloys used in the hydrogen electrodes each weighed 1.0 g. Then, test cells were produced respectively using these pellet type hydrogen electrodes, nickel electrodes having bigger enough capacities than the hydrogen electrodes, and electrolytes formed of an aqueous solution of KOH having a density of 30 wt. %. These test cells were used to measure the discharge capacities of their hydrogen electrodes. The results are also shown in Table 1. The testing temperature was 25° C.

As shown in Table 1, the pellet type hydrogen electrodes using the same alloys as those used for Electrodes $a_1$ through $a_6$ showed larger discharge capacities than the pellet type hydrogen electrodes using the same alloys as those used for Electrodes $x_1$ through $x_3$. The reason is: since the equilibrium pressure is lower, the amount of hydrogen absorbed/desorbed under the same pressure is larger in the former than the latter.

Experiment IC

Table 1 also shows the cycle characteristics of Cells $A_1$ through $A_6$ and $X_1$ through $X_3$. The cells were charged at 1,200 mA (2C) at 25° C. for 40 minutes and then discharged at 1,200 mA (2C) for 30 minutes. It was considered that each cell finished its cell life when its capacity was reduced to 50% of its initial value.

The cells were weighed before and after the cycle test in order to find how much weight each cell lost. The results are also shown in Table 1.

As shown in Table 1, Cells $A_1$ through $A_6$ had much longer cycle lives and lost much less weights than Cells $X_1$ through $X_3$. The reason is: since the low equilibrium pressures of the former do not increase their inner pressures very much, their safety valves are not operated, and therefore electrolyte leaks are prevented.

Summary of Experiments IA through IC

The above three experiments show that Cells $A_1$ through $A_6$ according to this invention have the following three advantages (a), (b) and (c) over Cells $X_1$ through $X_3$ as the comparative examples. As mentioned before, Cells $A_1$ through $A_6$ employ the hydrogen-absorbing alloys in which $3.85 \leq a+b+c \leq 4.78$ in $ANi_aCo_bMn_c$ while Cells $X_1$ through $X_3$ employ the hydrogen-absorbing alloys in which $a+b+c \leq 3.85$ or $a+b+c > 4.78$.

(a) Their hydrogen-absorbing alloys have low equilibrium pressures and so hydrogen is easily absorbed/desorbed.

(b) The electrodes comprising these alloys have large discharge capacities.

(c) The cycle lives are long and the weights are not lost much.

From the above, the hydrogen-absorbing alloy electrodes according to this invention are optimum for this kind of alkaline storage cells.

Experiment IIA

Pellet type hydrogen electrodes having various amounts of La in Mm of the hydrogen-absorbing alloys were used to produce test cells, and the initial discharge capacities of the hydrogen electrodes were measured. In the alloy composition represented by a formula $ANi_aCo_bMn_c$, $a+b+c$ was set 4.6 and $a:b:c$ was set 3.2:1.0:0.8. The test cell production method was the same as in Experiment IB. FIG. 1 shows the relationship between the initial discharge capacity of the pellet type hydrogen electrodes and the amount of La in Mm.

As shown in FIG. 1, when the amount of La was reduced to less than 20 wt. %, the initial discharge capacity was reduced. This occurred for the following reason. The larger the amount of La is, the lower the equilibrium pressure is. Therefore, when the amount of La is less than 20 wt. %, the equilibrium pressure is high. As a result, the amount of hydrogen absorbed/desorbed under the same pressure is small.

In conclusion, in order to get a large initial discharge capacity, the amount of La is preferably 20 wt. % or more.

Experiment IIB

Figure 2:
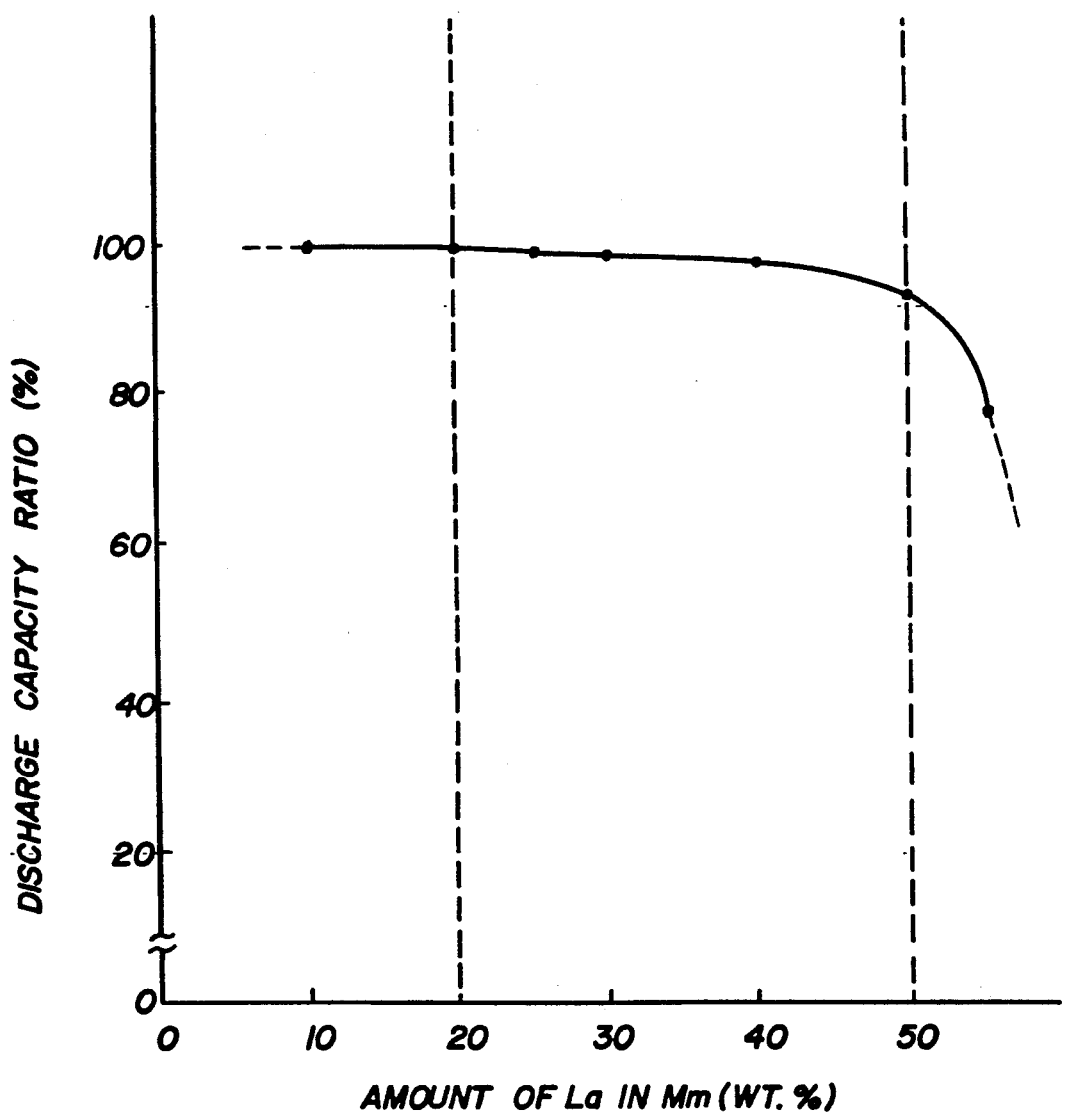
FIG. 2 is a graph showing the relationship between the amount of La in Mm and the discharge capacity ratio of each test cell.

The same test cells as those used in Experiment IIA were charged at 60 mA at 25° C. for 8 hours and then discharged at 60 mA for 4 hours. The cell discharge capacity B was measured after repeating the above charge-discharge cycles 500 times in order to obtain the ratio of B against the cell initial discharge capacity A (B/A; referred to as the discharge capacity ratio hereinafter). FIG. 2 shows the relationship between the discharge capacity ratio and the amount of La in Mm.

As shown in FIG. 2, when the amount of La exceeded 50 wt. %, the discharge capacity ratio drastically declined. This is considered to occur because corrosion resistance against alkali of the hydrogen-absorbing alloy is lowered by the increase of the amount of La. In order to increase the discharge capacity ratio, the amount of La is preferably 50 wt. % or less.

Summary of Experiments IIA and IIB

From the above, La is preferably contained in Mm in a weight ratio of $20 \leq La \leq 50$.

Experiment IIIA

Pellet type hydrogen electrodes having various amounts of Ni (various values of a) in the hydrogen-absorbing alloys were used to produce test cells, and the initial discharge capacities of the hydrogen electrodes were measured. In the alloy composition represented by a formula $ANi_aCo_bMn_c$, $a+b+c$ was set 4.6 and $b:c$ was set 1:1. The test cell production method was the same as in Experiment IB. FIG. 3 shows the relationship between the initial discharge capacity and the amount of Ni in the alloy.

As shown in FIG. 3, when the amount of Ni exceeded 3.5, the equilibrium pressure increased and so the initial discharge capacity decreased. On the other hand, when the amount of Ni was reduced to 3.5 or less, the equilibrium pressure did not increase and so the initial discharge capacity was increased. In order to get a large initial discharge capacity, the amount of Ni is preferably 3.5 or less.

Experiment IIIB

The same test cells as those used in Experiment IIIA were charged at 30 mA at 25° C. for 16 hours and then discharged at 30 mA until the cell voltage reached 1.0 V. The cell discharge capacity D was measured after repeating the above charge-discharge process 10 times in order to obtain the ratio of D against the cell initial discharge capacity C (D/C; the discharge capacity ratio). The discharge capacity ratio is considered to show how activated the hydrogen-absorbing alloys were. Because it is supposed that the alloys were still being activated after charge-discharge was repeated only 10 times.

As shown in FIG. 4 (relationship between the discharge capacity ratio and the amount of Ni in the alloy), when the amount of Ni was reduced to less than 2.5, the discharge capacity ratio decreased. It can be said that this result means that the degree of the alloy activation is low when $a < 2.5$ in the early stages of the charge-discharge cycles. The low activation of alloy is attributed to the insufficient catalytic action of nickel for electrode reaction. In order to activate the alloy, namely in order to increase the discharge capacity ratio, the amount of Ni is preferably 2.5 or more. When the amount of Ni is 2.5 or more, the discharge capacity measured after repeating the charge-discharge cycles 10 times is large, and so the alloy is easily activated.

Summary of Experiments IIIA and IIIB

From the above, Ni is preferably contained in the alloy in an amount of $2.5 \leq Ni \leq 3.5$.

Experiment IVA

Figure 5:
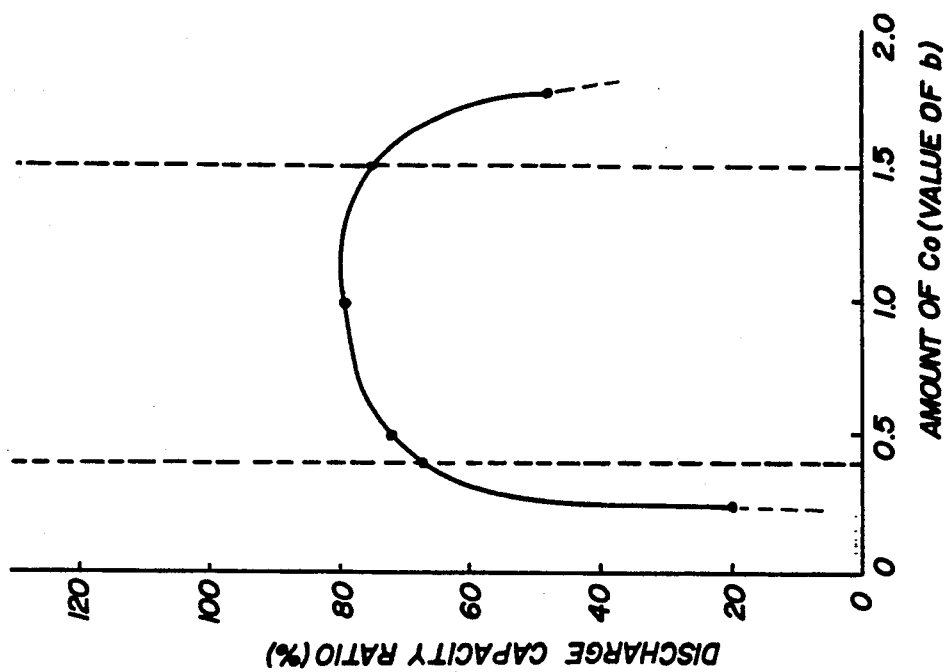
FIG. 5 is a graph showing the relationship between the amount of Co (value of b) in a hydrogen-absorbing alloy and the discharge capacity ratio of each test cell under a charge-discharge condition.

Hydrogen-absorbing alloys having various amounts of Co (various values of b) were used to produce test cells, and a cycle test was done on the cells. In the alloy composition represented by a formula $ANi_aCo_bMn_c$, $a+b+c$ was set 4.6 and $a:c$ was set 4:1. The test cell production method was the same as in Experiment IB. The cells were charged at 60 mA at 25° C. for 8 hours and then discharged at 60 mA for 4 hours. The cell discharge capacity F was measured after repeating the charge-discharge cycles 500 times in order to obtain the ratio of F against the initial discharge capacity E (F/E; the discharge capacity ratio). FIG. 5 shows the relationship between the discharge capacity ratio and the amount of Co in the alloy.

As shown in FIG. 5, when the amount of Co in the alloy was reduced to less than 0.4, the discharge capacity ratio was lowered. The reason is: when the amount of Co is small, corrosion resistance against alkali of the hydrogen-absorbing alloy is decreased and so the alloy is easy to corrode in the electrolyte. In order to get a hydrogen-absorbing alloy which is durable against charge-discharge cycles, the amount of Co is preferably 0.4 or more.

Experiment IVB

Figure 6:
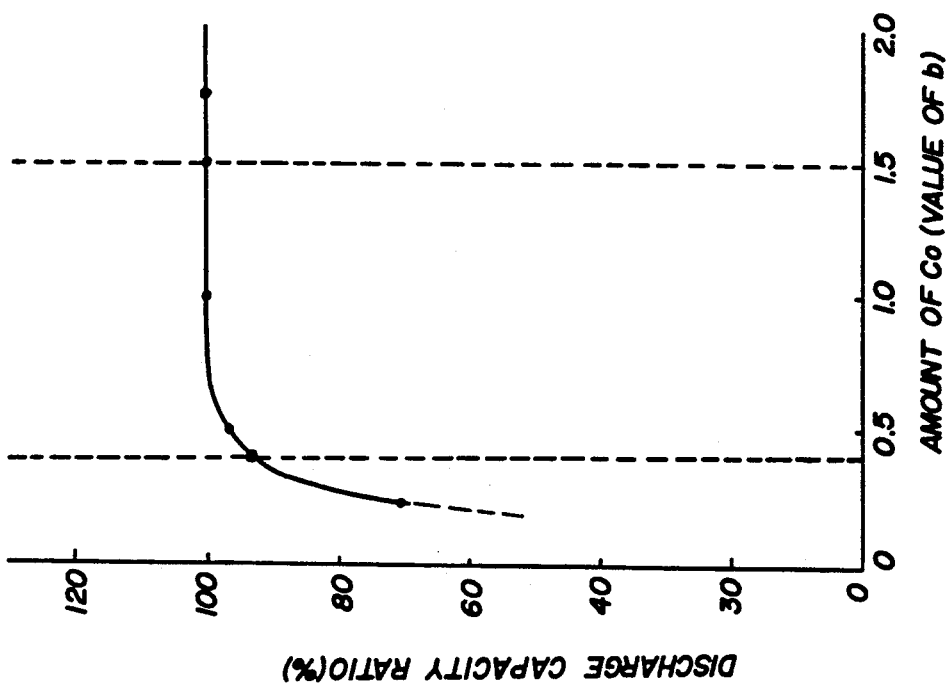
FIG. 6 is a graph showing the relationship between the amount of Co (value of b) in a hydrogen-absorbing alloy and the discharge capacity ratio of each test cell under a different charge-discharge condition.

The same test cells as those used in Experiment IVA were charged at 60 mA at 25° C. for 8 hours and then over-discharged at 60 mA until each cell potential reached −0.5 V. Then, the ratio of the cell discharge capacity measured after repeating the charge-discharge cycles 500 times against the cell initial discharge capacity (the discharge capacity ratio) was obtained in the same way as in Experiment IVA. FIG. 6 shows the relationship between the discharge capacity ratio and the amount of Co in the alloy.

As shown in FIG. 6, when the amount of Co was reduced to less than 0.4, the discharge capacity ratio was decreased in the similar way as in Experiment IVA. When the amount of Co exceeded 1.5, the discharge capacity ratio was also decreased. This is because Co is dissolved out of the alloy by over-discharging.

Summary of Experiments IVA and IVB

From the above, Co is preferably contained in the alloy in an amount of $0.4 \leq Co \leq 1.5$.

Experiment V

Figure 7:
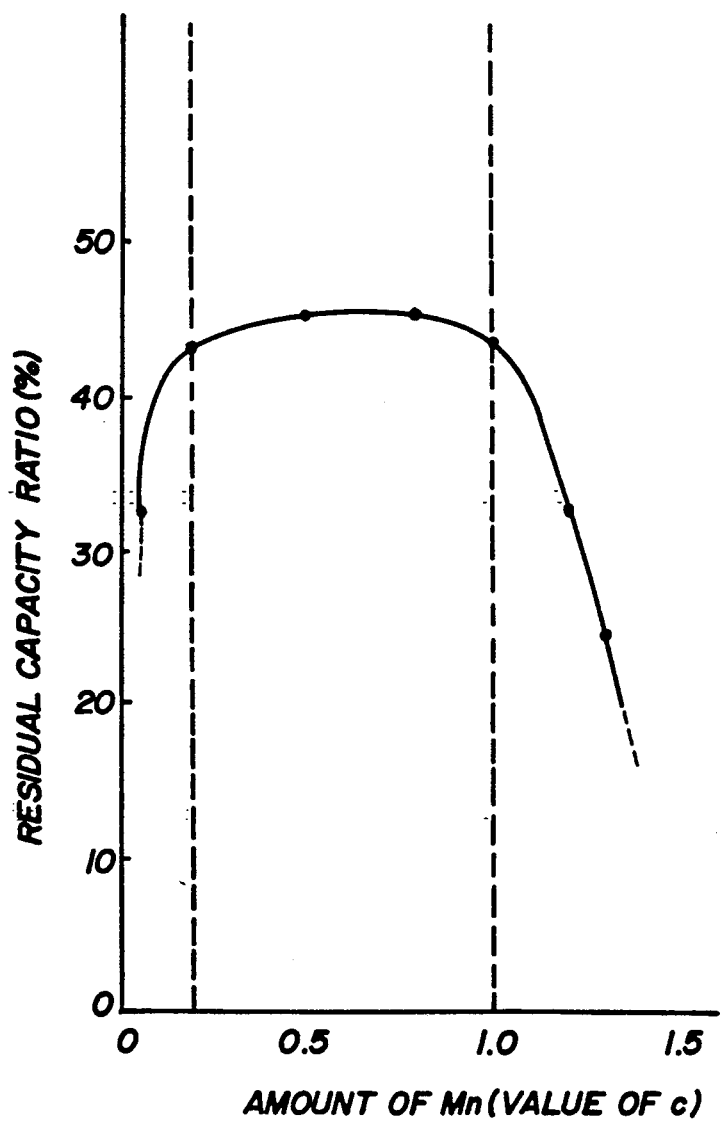
FIG. 7 is a graph showing the relationship between the amount of Mn (value of c) in a hydrogen-absorbing alloy and the residual capacity ratio of each test cell.

Hydrogen-absorbing alloys having various amounts of Mn (various values of c) were used to produce test cells, and these cells were subjected to the following experiment in order to check their storage characteristics. In the alloy composition represented by a formula $ANi_aCo_bMn_c$, $a+b+c$ was set 4.6 and $a:b$ was set 3:1. The test cell production method was the same as in Experiment IB. The cells were charged at 120 mA (0.2C) at 25° C. for 6 hours and then discharged at 120 mA until each cell voltage reached 1.0 V. After this process was repeated three times, the cells were again charged at 120 mA for 6 hours and stored for 10 days in an ambient temperature of 60° C. Then, the discharge capacity H of each cell was measured in order to obtain the ratio of H against the initial discharge capacity G (H/G; referred to as the residual capacity ratio hereinafter). FIG. 7 shows the relationship between the residual capacity ratio and the amount of Mn in the alloy.

As shown in FIG. 7, when $0.2 \leq Mn \leq 1.0$, the residual capacity ratio was high, showing an excellent storage characteristic. When the amount of Mn exceeded 1.0, the residual capacity ratio decreased. This is because Mn is dissolved out of the alloy, which may cause local inner short-circuiting. When the amount of Mn was reduced to less than 0.2, the residual capacity ratio was also decreased. The reason will follow. Since the equilibrium pressure is raised, hydrogen generated from the hydrogen-absorbing alloy electrode is consumed in the positive electrode, thereby accelerating self-discharge. This deteriorates the storage characteristics.

Summary of Experiment V

From the above, Mn is preferably contained in the alloy in an amount of $0.2 \leq Mn \leq 1.0$.

Summary of Experiments I through V

The following is a preferable condition of the hydrogen-absorbing alloy used for a negative electrode in order to obtain an alkaline storage cell having various excellent characteristics.

In the formula $ANi_aCo_bMn_c$,
the amount of Ni (value of a): $2.5 \leq a \leq 3.5$
the amount of Co (value of b): $0.4 \leq b \leq 1.5$
the amount of Mn (value of c): $0.2 \leq c \leq 1.0$
$3.85 \leq a + b + c \leq 4.78$

Embodiment II

Examples I through VIII of the Present Invention

A mixture of A, Ni, Co and Mn was added with at least one element X selected from a group of W, Si, B and Sn in ratios mentioned in Table 2, thereafter alloys represented by the formula $ANi_aCo_bMn_cX_d$ were produced in the same method as in Embodiment I. These alloys were respectively used in the method mentioned in Embodiment I to produce Cells $B_1$ through $B_8$. Each cells included the above elements in a value of $3.85 \leq a+b+c+d \leq 4.78$.

Comparative examples I through V

A mixture of A, Ni, Co and Mn was added with at least one element X selected from a group of W, Si, B and Sn in ratios mentioned in Table 2, thereafter alloys represented by the formula $ANi_aCo_bMn_cX_d$ were produced in the same method as in Embodiment I. These alloys were respectively used in the method mentioned in Embodiment I to produce Cells $Y_1$ through $Y_5$. Each cells included the above elements in a value of $a+b+c+d<3.85$ or $a+b+c+d>4.78$.

TABLE 2

| Cells | Added element X | Amount of X (d) | Value of $a + b + c + d$ | Capacity after storage (mAH) |
|---|---|---|---|---|
| $B_1$ | W | 0.08 | 4.75 | 420 |
| $B_2$ | W | 0.15 | 4.75 | 435 |
| $B_3$ | Si | 0.15 | 4.75 | 440 |
| $B_4$ | Si | 0.09 | 4.3 | 410 |
| $B_5$ | B | 0.05 | 4.5 | 399 |
| $B_6$ | B | 0.15 | 4.75 | 420 |
| $B_7$ | Sn | 0.15 | 4.75 | 390 |
| $B_8$ | Sn | 0.29 | 4.60 | 411 |
| $Y_1$ | W | 0.08 | 3.5 | 265 |
| $Y_2$ | W | 0.15 | 5.0 | 270 |
| $Y_3$ | Si | 0.1 | 5.0 | 275 |
| $Y_4$ | B | 0.2 | 3.5 | 261 |
| $Y_5$ | Sn | 0.17 | 5.0 | 279 |

Experiment

The storage characteristics of Cells $B_1$ through $B_8$ according to this invention and Cells $Y_1$ through $Y_5$ as the comparative examples were checked in the same method in Experiment V of Embodiment I. Table 2 shows the results.

As shown in Table 2, Cells $B_1$ through $B_8$ ($ANi_aCo_bMn_cX_d$ where $2.5 \leq a \leq 3.5$; $0.4 \leq b \leq 1.5$; $0.2 \leq c \leq 1.0$; and $3.85 \leq a+b+c+d \leq 4.78$) showed larger capacities after after storage, namely better storage characteristics, than Cells $Y_1$ through $Y_5$.

A cell without X ($a+b+c=4.75$) showed a discharge capacity of 270 mA after storage, which means the present invention cells of Embodiment II are more excellent than the cells without X (Embodiment I). This is considered to occur because the added element acts as a thin barrier layer on a surface of the alloy.

Embodiment III

Examples I through VIII of the Present Invention

A mixture of A, Ni, Co and Mn was added with at least one element X selected from a group of Al, Cu, Mo and Fe in ratios mentioned in Table 3, thereafter alloys represented by the formula $ANi_aCo_bMn_cX_d$ were produced in the same method as in Embodiment I. These alloys were respectively used in the method mentioned in Embodiment I to produce Cells $C_1$ through $C_8$. Each cells included the elements in a value of $3.85 \leq a+b+c+d \leq 4.78$.

Comparative examples I through V

A mixture of A, Ni, Co and Mn was added with at least one element X selected from a group of Al, Cu, Mo and Fe in ratios mentioned in Table 3, thereafter alloys represented by the formula $ANi_aCo_bMn_cX_d$ were produced in the same method as in Embodiment I. These alloys were respectively used in the method mentioned in Embodiment I to produce Cells $Z_1$ through $Z_5$. Each cells included the above elements in a value of $a+b+c+d<3.85$ or $a+b+c+d>4.78$.

TABLE 3

| Cells | Added element X | Amount of X (d) | Value of a + b + c + d | Capacity after storage (mAH) |
|---|---|---|---|---|
| $C_1$ | Al | 0.15 | 4.5 | 2400 |
| $C_2$ | Al | 0.19 | 4.75 | 2500 |
| $C_3$ | Cu | 0.05 | 4.50 | 2700 |
| $C_4$ | Cu | 0.19 | 4.75 | 2500 |
| $C_5$ | Mo | 0.05 | 4.50 | 2700 |
| $C_6$ | Mo | 0.19 | 4.75 | 2500 |
| $C_7$ | Fe | 0.05 | 4.05 | 2400 |
| $C_8$ | Fe | 0.19 | 4.75 | 2300 |
| $Z_1$ | Al | 0.05 | 3.5 | 1300 |
| $Z_2$ | Al | 0.28 | 5.0 | 1900 |
| $Z_3$ | Cu | 0.05 | 3.5 | 1000 |
| $Z_4$ | Mo | 0.27 | 5.0 | 1600 |
| $Z_5$ | Fe | 0.29 | 5.0 | 1550 |

Experiment I

The cycle characteristics of Cells $C_1$ through $C_8$ according to this invention and Cells $Z_1$ through $Z_5$ as the comparative examples were checked. The results are shown in Table 3. The cells were charged at 600 mA for 75 minutes and then discharged at 600 mA for 1 hour. It was considered that each cell finished its cell life when its capacity was reduced to 50% of its initial value.

As shown in Table 3, Cells $C_1$ through $C_8$ ($ANi_aCo_bMn_cX_d$ where $2.5 \leq a \leq 3.5$; $0.4 \leq b \leq 1.5$; $0.2 \leq c \leq 1.0$; and $3.85 \leq a+b+c+d \leq 4.78$) had better cycle characteristics than Cells $Z_1$ through $Z_5$.

A cell without X ($a+b+c=4.75$) showed a discharge capacity of 1,500 mA after storage, which means the present invention cells in Embodiment III are more excellent than the cells without X (Embodiment I).

Experiment II

Pellet type hydrogen electrodes having various amounts of X (various values of d) in the hydrogen-absorbing alloys were used to produce test cells. X is at least one element selected from a group of Fe, Cu, Mo, W, B, Al, Si and Sn. The test cell production method was the same as in Experiment IB. The high-rate charge characteristics of these cells were checked under the following conditions.

The test cells were charged at 30 mA at 25° C. for 16 hours and then discharged at 30 mA until each cell voltage reached 1.0 V. At this stage, the discharge capacity of each electrode was measured and named J. Then, the cells were again charged at 150 mA for 3.2 hours and discharged at 30 mA until each cell voltage reached 1.0 V. The discharge capacity of each electrode was again measured and named K in order to obtain the ratio of K against J as the charging efficiency (K/J; the discharge capacity ratio). FIG. 8 shows the relationship between the discharge capacity ratio and the amount of X in the alloy.

As shown in FIG. 8, when the amount of X exceeded 0.3, the charging efficiency was declined. This is considered to occur because the added elements existing as a thin barrier layer on a surface of the alloy has an adverse effect on electrode reaction. As a conclusion, the amount of the added element X in the hydrogen-absorbing alloy is preferably 0.3 or less.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A hydrogen-absorbing alloy electrode mainly comprising a hydrogen-absorbing alloy represented by a formula $MmNi_aCo_bMn_c$, Mm representing a Misch metal comprising rare earth elements including La, wherein $2.5<a<3.5$, $0.4<b<1.5$, $0.2<c<1.0$, and $3.85<a+b+c<4.78$ and wherein La is contained in said alloy in a weight percent relative to the total weight of rare earth of $20<La<50$.

2. A hydrogen-absorbing alloy electrode mainly comprising a hydrogen-absorbing alloy represented by a formula $MmNi_aCo_bMn_cX_d$, Mm representing a Misch metal comprising rare earth elements including La and X representing at least one element selected from a group of Fe, Cu, Mo, W, B, Al, Si and Sn, wherein $2.5<a<3.5$, $0.4<b<1.5$, $0.2<c<1.0$, $0<d<0.3$, and $3.85<a+b+c+d<4.78$ and wherein La is contained in said alloy in a weight percent relative to the total weight of rare earth elements of $20<La<50$.

3. A production method of a hydrogen-absorbing alloy electrode mainly comprising a hydrogen-absorbing alloy represented by a formula $MmNi_aCo_bMn_c$, Mm representing a Misch metal comprising rare earth elements including La, comprising:

a first step of weighing Mm, Ni, Co and Mn to obtain these elements in amounts of $2.5<a<3.5$, $0.4<b<1.5$, $0.2<c<1.0$, and $3.85<a+b+c<4.78$, and La comprises 20 to 50 weight percent of the total rare earth elements.

a second step of producing a hydrogen-absorbing alloy by loading Mm, Ni, Co and Mn obtained in the first step in an arc furnace having an inactive argon on atmosphere then melting the same, a third step of pulverizing the hydrogen-absorbing alloy into grains having an average grain size of not larger than 50 mm, a fourth step of mixing the alloy pulverized in the third step and a binder into a paste, and a fifth step of coating the paste on a current collector.

4. A production method of claim 3 wherein the binder in the fourth step is polytetrafluoroethylene.

5. A production method of claim 3 wherein the current collector in the fifth step is a punched metal.

6. A production method of a hydrogen-absorbing alloy electrode mainly comprising a hydrogen-absorbing alloy represented by a formula $ANi_aCo_bMn_cX_d$, A representing a mixture of rare earth elements including La and X representing at least one element selected from a group of Fe, Cu, Mo, W, B, Al, Si and Sn, comprising:

a first step of weighing A, Ni, Co, Mn and X to obtain these elements in amounts of $2.5 \leq a \leq 3.5$, $0.4 \leq b \leq 1.5$, $0.2 \leq c \leq 1.0$, $0 < d \leq 0.3$ and $3.85 \leq a+b+c+d \leq 4.78$, a second step of producing a hydrogen-absorbing alloy by loading A, Ni, Co, Mn and X obtained in the first step in a furnace and then melting the same, a third step of pulverizing the hydrogen-absorbing alloy, a fourth step of mixing the alloy pulverized in the third step and a binder into a paste, and a fifth step of coating the paste on a current collector.

* * * * *